March 14, 1961    R. F. REIFERS ET AL    2,974,843
FOOD CONTAINER
Filed July 23, 1958
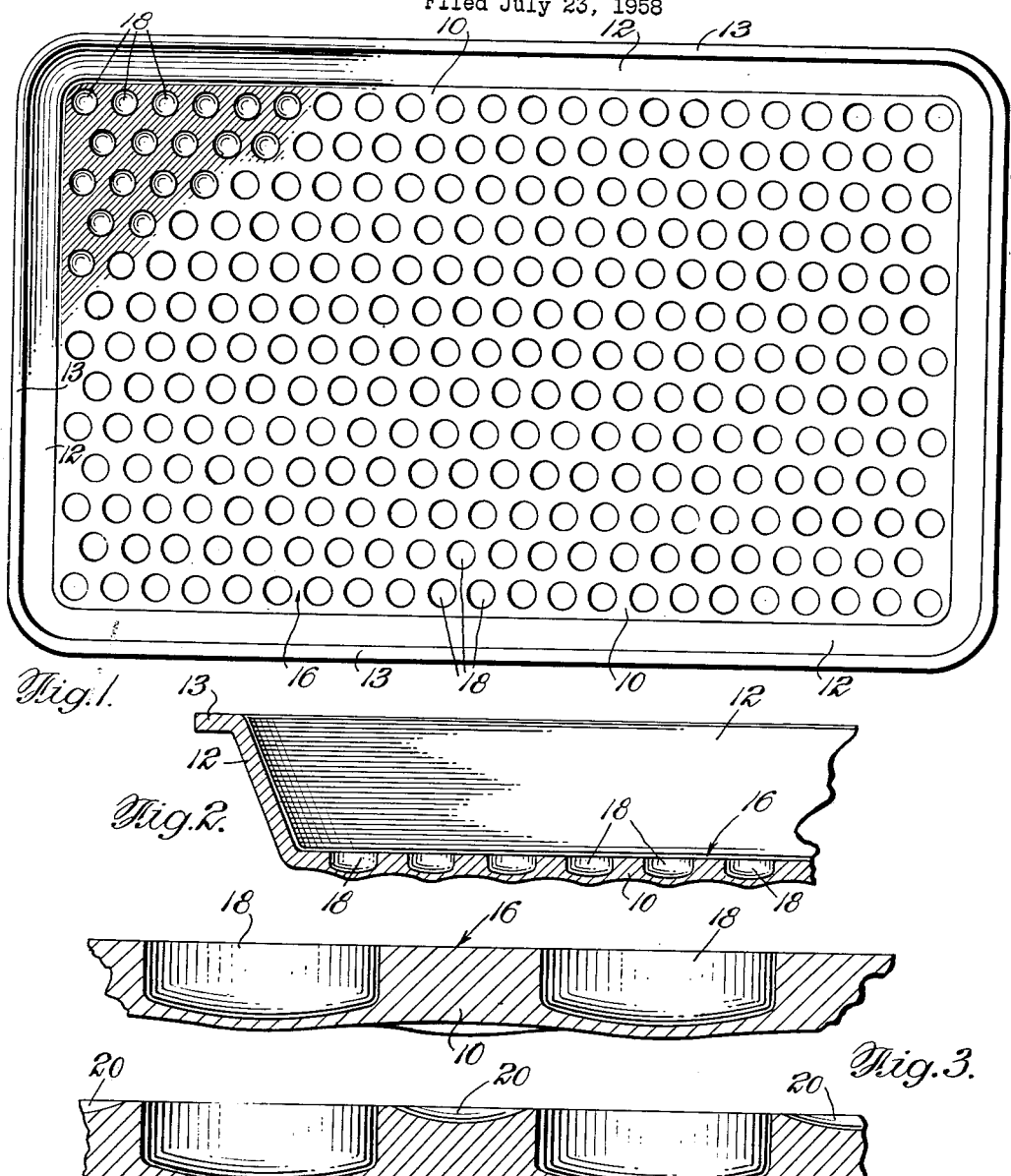
INVENTORS
Richard F. Reifers,
Roger Wells.
BY Karl W. Flocks
ATTORNEY United States Patent Office 2,974,843
Patented Mar. 14, 1961

2,974,843
FOOD CONTAINER

Richard F. Reifers and Roger Wells, Stamford, Conn., assignors to Diamond National Corporation, a corporation of Delaware Filed July 23, 1958, Ser. No. 750,495
18 Claims. (Cl. 229—2.5)

This invention relates to articles molded from fibrous material such as wood pulp, and more particularly to a molded pulp container for packaging and storing meat, poultry and the like.

In most meat markets today, the meat and poultry products are packaged for display and sale in a container made of wood pulp, usually covered by a sheet of cellophane which is heat sealed to the bottom surface of the container. Such containers are generally of a rectangular shape having upstanding side walls and a flat bottom surface adapted to receive the meat.

Such containers have been found to have several deficiencies which, until now, have not been corrected. One difficulty with such containers is that the meat to be packaged may be bloody or wet, and when the customer picks up the package containing the meat or poultry, and subjects it to the normal amount of handling, the juices are free to run around inside the sealed package if there is no means available for trapping these juices.

One of the most difficult problems is packaging meat and poultry effectively is to provide a container that will trap the juice of the meat or poultry without becoming excessively soggy or allowing the juice to leak from the package. These conditions greatly reduce the strength of the product and also reduce the sales appeal.

It has been suggested that the container be made from a highly absorbent pulp by using unsized pulp so that the juices can be rapidly absorbed into the container. Wet strength resins could be added to retain the original strength of the container. The disadvantage of this container is that the highly absorbent pulp not only absorbs the free juices but also acts to dehydrate the meat or poultry contained in the package.

It is therefore an object of the present invention to provide a food container particularly adapted for packaging meat and poultry products which will mechanically trap the juices of the product packaged therein without dehydrating these products.

It is a further object of the present invention to provide a molded pulp food container particularly adapted for packaging meat and poultry products that is provided with an improved structure of the bottom surface thereof to effectively trap the juices of the products packaged therein.

It is a still further object of the present invention to provide a meat or poultry container made of molded pulp, having its bottom surface provided with a number of depressions adapted to trap the juices of the products packaged therein.

A still further object of the invention is to provide a food container made of molded pulp having a number of depressions in the bottom surface of such shape and size, whereby the juices of meat and poultry contained therein are mechanically trapped in the depressions by capillary action due to the surface tension of the juices.

Other objects and the nature and advantages of the instant invention will be apparent from the following description taken in conjunction with the accompanying drawings, wherein:

Fig. 1 is a top plan view of one form of the invention;
Fig. 2 is a cross-sectional view along the line 2—2 of Fig. 1;
Fig. 3 is a fragmentary cross-sectional view of the depressions; and
Fig. 4 is a fragmentary cross-sectional view of the depressions, showing a modification of the present invention.

As illustrated in the drawings, in Figs. 1–3 the food container in accordance with this invention comprises a bottom wall 10 and upstanding side walls 12 integral therewith, having a lip 13 extending outwardly around the upper periphery thereof. The upper surface 16 of the bottom wall is provided with a plurality of depressions or cups 18 distributed over the entire bottom wall of the container.

For maximum effectiveness, it has been found that the number, shape and size of the depressions or cups 18 must be closely controlled.

It has been discovered that the ability of the cups 18 to mechanically trap the liquids here involved is a function of the shape and size of the cups. It was discovered that a diameter of 5/32″ to 7/32″ of the cups is critical in order to properly mechanically trap these liquids. A drop of the liquid will not enter the cups if the diameter is less than 5/32″, and if the diameter is greater than 7/32″, the drop will run out when the container is inverted. Due to the surface tension of the liquid, the drop will enter the cup and will not run out when the container is inverted when the diameter of the cup is in the critical diameter range of 5/32″ to 7/32″.

Further, it has been discovered that the efficiency of the cups to trap liquids requires that the cups have a sharply defined side and upper lip as illustrated in the figures.

For maximum effectiveness it has been found that the depressions or cups 18 must be distributed over the entire bottom wall of the container, so that the total area of the holes represents approximately one-fifth to one-third of the total area of the bottom surface.

For maximum effectiveness, the depressions or cups should have smooth side walls, as well as the sharply defined upper lip. These features can be obtained by molding the pulp over a forming wire containing a plurality of solid nubbins of rubber, bronze or plastic distributed over the surface thereof. In molding the pulp fibers in this manner, the resulting container is found to have a rather regular pattern of fibers along the upper surface of the bottom wall of the container, which is formed against the perforate forming wire and has the characteristic woven felted pattern to the fibers. On the contrary, the fibers formed against the solid nubbins are at random and form a rather irregular pattern of fibers formed around the nubbins. The irregular pattern along the side walls of the cups 18 results in increased absorption along these areas. Therefore the absorption from the side walls of the cups is more rapid than the absorption from the top surface of the container between the cups.

The depth of the cups in the bottom of the food containers has been found to be important also. For maximum effectiveness, the cups should be as deep as possible, consistent with the thickness of the bottom wall. With such deep cups, it becomes apparent that where the covering of the pulp stock over the perforations in the bottom is comparatively thin, there will be more likelihood of the juices soaking entirely through the container at these points. This can be corrected by the addition of wet strength resins and harder sizing to the pulp. Cups having a depth of from 0.06″ to 0.125″ have been found to be particularly effective.

A modification of the present invention is shown in Fig. 4. In this form of the invention, in addition to the cups 18, there are provided a plurality of hemispherically shaped depressions 20 located in the area between the cups 18. These depressions 20 can be formed by indentations in the forming wire between the cups 18. These hemispherical depressions act to reduce the total contact area between the container and the meat or poultry packaged therein, thereby allowing more breathing space therebetween. These depressions likewise form additional juice-absorption pockets which are, however, less effective than the cups 18 for trapping the juices since the curved sides of the depressions do not allow of the juices to be trapped by capillary action. Further, the depressions 20 assist in providing a more uniform thickness in the bottom of the container by limiting the height to which the pulp must rise in the areas between the nubbins on the molding screen.

The food container can thus be seen to be made of molded fiber, having the upper surface of the bottom wall thereof provided with a plurality of hollow, cylindrical shaped cups distributed over the entire bottom wall. The diameter of these cups must be within the critical limits of $5/32''$ to $7/32''$, whereby the juices of meat or poultry in the container will be effectively trapped by the surface tension of the juices.

A specific example of a container in accordance with the present invention is one with a bottom wall having distributed over its entire upper surfaces a plurality of cups of a diameter of $3/16''$, a depth of $0.100''$, with holes on $5/16''$ centers staggered. The cups have sharply defined side walls and upper lips. The container is molded of pulp fibers over a forming wire to which are attached solid nubbins of the proper spacing. These nubbins are outside of the wire and present a smooth surface so that the pulp bridges over as the water is drained out through the remaining area which is covered by the wire.

Containers made in accordance with this example have been found extremely effective in trapping the juices from meat or poultry products packaged therein.

It will be obvious to those skilled in the art that various changes may be made without departing from the spirit of the invention and therefore the invention is not limited to what is shown in the drawings and described in the specification, but only as indicated in the appended claims.

What we claim is:

1. A food container of pulp material adapted for the packaging of meat and poultry, comprising a bottom wall and upstanding side walls, said bottom wall having an upper surface provided with a plurality of cylindrical cups therein, said cups being distributed over the entire surface of said bottom wall, said cups being of such shape and size as to be capable of mechanically trapping any juices resulting from the food product stored therein by the surface tension of said juices.

2. A food container in accordance with claim 1 wherein the upper surface of said bottom wall is less absorbent than the side walls of said cups.

3. A food container in accordance with claim 1 wherein said cups have a diameter of $5/32''$ to $7/32''$.

4. A food container in accordance with claim 3 wherein the total area of the cups represents approximately from one-fifth to one-third of the total area of the bottom surface.

5. A food container in accordance with claim 1, wherein the total area of the cups represents approximately one-fifth to one-third of the total area of the bottom surface.

6. A food container of pulp material adapted for the packaging of meat and poultry, comprising a tray having a bottom wall and upstanding side walls, said bottom wall having an upper surface provided with a plurality of cylindrical cups evenly distributed over the entire surface of the bottom wall, each said cup having a sharply defined vertical side wall and upper lip and being of such shape and size as to be capable of mechanically trapping any juices resulting from the food product stored therein by the surface tension of said juice.

7. A food container in accordance with claim 6 wherein said cups have a diameter of $5/32''$ to $7/32''$.

8. A food container in accordance with claim 7 wherein the total area of the cups represents approximately one-fifth to one-third of the total area of the bottom surface.

9. A food container in accordance with claim 6 wherein the total area of the cups represents approximately one-fifth to one-third of the total area of the bottom surface.

10. A food container in accordance with claim 6 wherein a plurality of shallow depressions are provided in the upper surface of said bottom wall, one of said depressions being located in the space between each set of four said cups.

11. A food container in accordance with claim 10 wherein said cups have a diameter of $5/32''$ to $7/32''$.

12. A food container in accordance with claim 6 wherein said cups have a diameter of $3/16''$ and a depth of $0.100''$ with the cups staggered on $5/16''$ centers.

13. A food container of pulp material adapted for the packaging of meat and poultry, comprising a bottom wall and upstanding side walls, said bottom wall having an upper surface provided with a plurality of depressions therein, each said depression having a cross section parallel to the plane of the bottom wall which is a closed geometric figure, said depressions having sharply defined vertical side walls and upper lips and being of such width and depth as to be capable of mechanically trapping any juices resulting from the food product stored therein due to the surface tension of said juices.

14. A food container in accordance with claim 13, wherein the upper surface of said bottom wall is less absorbent than the side walls of said depressions.

15. A food container in accordance with claim 13, wherein said depressions have a width of $5/32''$ to $7/32''$.

16. A food container in accordance with claim 15, wherein said depressions have a depth of $1/16''$ to $1/8''$.

17. A food container of pulp material adapted for the packaging of meat and poultry, comprising a bottom wall and upstanding side walls, said bottom wall having an upper surface provided with a plurality of depressions therein in the shape of cylindrical cups, each depression having a sharply defined vertical side wall and upper lip, said depressions being of such shape and size as to be capable of mechanically trapping any juices resulting from the food product stored therein due to the surface tension of said juices.

18. A food container in accordance with claim 17, wherein the upper surface of said bottom wall is less absorbent than the side walls of said depressions.

References Cited in the file of this patent

UNITED STATES PATENTS

| | | |
|---|---|---|
| 924,849 | Smith | June 15, 1909 |
| 1,305,203 | Drake | May 27, 1919 |
| 1,701,238 | Kennedy | Feb. 5, 1929 |
| 1,865,742 | Chapman | July 5, 1932 |
| 1,962,655 | Hall | June 12, 1934 |
| 2,461,227 | Mewherter | Feb. 8, 1949 |
| 2,629,533 | Chaplin | Feb. 24, 1953 |
| 2,631,520 | Geerling | Mar. 17, 1953 |
| 2,748,672 | Kolimann | June 5, 1956 |
| 2,754,729 | Emery | July 17, 1956 |

FOREIGN PATENTS

| | | |
|---|---|---|
| 3,735 | Great Britain | Apr. 6, 1889 |